US009315701B2

(12) United States Patent
Wang et al.

(10) Patent No.: US 9,315,701 B2
(45) Date of Patent: Apr. 19, 2016

(54) TWO PART HYBRID ADHESIVE

(71) Applicant: Henkel IP & Holding GmbH, Duesseldorf (DE)

(72) Inventors: Yongxia Wang, Bridgewater, NJ (US); Charles W. Paul, Madison, NJ (US)

(73) Assignee: Henkel IP & Holding GmbH, Duesseldorf (DE)

( * ) Notice: Subject to any disclaimer, the term of this patent is extended or adjusted under 35 U.S.C. 154(b) by 87 days.

(21) Appl. No.: 14/266,137

(22) Filed: Apr. 30, 2014

(65) Prior Publication Data

US 2014/0235793 A1    Aug. 21, 2014

Related U.S. Application Data

(62) Division of application No. 12/058,023, filed on Mar. 28, 2008, now Pat. No. 8,742,050.

(51) Int. Cl.

| | |
|---|---|
| *C08G 79/08* | (2006.01) |
| *C09J 175/02* | (2006.01) |
| *C08G 18/10* | (2006.01) |
| *C08G 18/32* | (2006.01) |
| *C08G 18/36* | (2006.01) |
| *C08G 18/50* | (2006.01) |
| *C08G 18/62* | (2006.01) |
| *C08G 18/63* | (2006.01) |
| *C08G 18/67* | (2006.01) |
| *C09J 175/04* | (2006.01) |
| *C08K 5/00* | (2006.01) |
| *C08K 5/55* | (2006.01) |
| *C08L 33/06* | (2006.01) |

(52) U.S. Cl.
CPC ............. *C09J 175/02* (2013.01); *C08G 18/10* (2013.01); *C08G 18/3268* (2013.01); *C08G 18/36* (2013.01); *C08G 18/5021* (2013.01); *C08G 18/6225* (2013.01); *C08G 18/637* (2013.01); *C08G 18/672* (2013.01); *C09J 175/04* (2013.01); *C08K 5/0091* (2013.01); *C08K 5/55* (2013.01); *C08L 33/06* (2013.01)

(58) Field of Classification Search
CPC .... C08G 18/10; C08G 18/3268; C08G 18/36; C08G 18/5021; C08G 18/6225; C08G 18/637; C08G 18/672
USPC ......................................................... 528/7, 70
See application file for complete search history.

(56) References Cited

U.S. PATENT DOCUMENTS

| | | | |
|---|---|---|---|
| 3,532,652 A | 10/1970 | Lader et al. | |
| 4,639,498 A | 1/1987 | Ritter | |
| 4,676,858 A | 6/1987 | Ritter | |
| 4,921,921 A | 5/1990 | Ritter | |
| 5,034,464 A | 7/1991 | Arduengo | |
| 5,106,928 A | 4/1992 | Skoultchi et al. | |
| 5,143,884 A | 9/1992 | Skoultchi et al. | |
| 5,286,821 A | 2/1994 | Skoultchi | |
| 5,472,785 A | 12/1995 | Stobbie, IV et al. | |
| 5,512,527 A | 4/1996 | Ritter | |
| 5,616,796 A | 4/1997 | Pocius et al. | |
| 5,621,143 A | 4/1997 | Pocius | |
| 5,681,910 A | 10/1997 | Pocius | |
| 5,684,102 A | 11/1997 | Pocius et al. | |
| 5,686,544 A | 11/1997 | Pocius | |
| 5,690,780 A | 11/1997 | Zharov et al. | |
| 5,691,065 A | 11/1997 | Zharov et al. | |
| 5,718,977 A | 2/1998 | Pocius | |
| 5,795,657 A | 8/1998 | Pocius et al. | |
| 5,872,197 A | 2/1999 | Deviny | |
| 5,883,208 A | 3/1999 | Deviny | |
| 5,935,711 A | 8/1999 | Pocius et al. | |
| 5,990,036 A | 11/1999 | Deviny | |
| 5,994,484 A | 11/1999 | Pocius | |
| 6,008,308 A | 12/1999 | Pocius | |
| 6,027,813 A | 2/2000 | Deviny | |
| 6,087,463 A | 7/2000 | Tada et al. | |
| 6,093,778 A | 7/2000 | Pocius | |
| 6,252,023 B1 | 6/2001 | Moren | |
| 6,284,381 B1 | 9/2001 | Zharov et al. | |
| 6,384,165 B1 | 5/2002 | Moren | |
| 6,479,602 B1 | 11/2002 | Moren | |
| 6,630,555 B2 | 10/2003 | Kendall et al. | |
| 6,713,578 B2 | 3/2004 | Sonnenschein et al. | |
| 6,713,579 B2 | 3/2004 | Sonnenschein et al. | |
| 6,734,268 B2 | 5/2004 | Moren | |
| 6,740,716 B2 | 5/2004 | Webb et al. | |
| 6,762,260 B2 | 7/2004 | Sonnenschein et al. | |
| 6,777,512 B1 | 8/2004 | Sonnenschein et al. | |
| 6,806,330 B1 | 10/2004 | Sonnenschein et al. | |
| 6,812,308 B2 | 11/2004 | Deviny et al. | |
| 6,825,298 B2 | 11/2004 | Sonnenschein et al. | |
| 6,844,080 B2 | 1/2005 | Kneafsey et al. | |
| 6,867,271 B1 | 3/2005 | Maandi et al. | |

(Continued)

FOREIGN PATENT DOCUMENTS

| | | |
|---|---|---|
| CN | 1487043 | 4/2004 |
| EP | 0632077 | 1/1995 |
| EP | 0632077 | 4/1995 |
| JP | 11-512123 | 10/1999 |
| JP | 2003277716 | 4/2003 |
| JP | 2006034882 | 2/2006 |
| JP | 2006183000 | 7/2006 |

(Continued)

*Primary Examiner* — Shane Fang
(74) *Attorney, Agent, or Firm* — Steven C. Bauman

(57) ABSTRACT

Provided are two part hybrid adhesives that comprise an organoborane amine complex, a polyamine, a component polymerizable by free radical polymerization, and a polyisocyanate component. An isocyanate terminated prepolymer can advantageously be used in the practice of the invention. The adhesive is particularly well suited for low surface energy plastic bonding.

8 Claims, No Drawings

(56) References Cited

U.S. PATENT DOCUMENTS

| | | |
|---|---|---|
| 6,911,109 B2 | 6/2005 | Giroux et al. |
| 6,939,932 B2 | 9/2005 | Kneafsey et al. |
| 6,967,226 B2 | 11/2005 | Shah |
| 7,098,279 B2 | 8/2006 | Maandi et al. |
| 7,112,631 B2 | 9/2006 | Zhang et al. |
| 7,185,946 B2 | 3/2007 | Cate et al. |
| 7,189,463 B2 | 3/2007 | Kneafsey et al. |
| 7,235,617 B2 | 6/2007 | Webb et al. |
| 7,247,596 B2 | 7/2007 | Jialanella et al. |
| 7,250,091 B2 | 7/2007 | Gupta et al. |
| 7,534,843 B2 | 5/2009 | Jialanella et al. |
| 8,082,616 B2 | 12/2011 | Tameno et al. |
| 2004/0071977 A1 | 4/2004 | Shah |

FOREIGN PATENT DOCUMENTS

| | | |
|---|---|---|
| JP | 2007515547 | 6/2007 |
| WO | 9707171 | 2/1997 |

TWO PART HYBRID ADHESIVE

FIELD OF THE INVENTION

The invention relates to a polymerizable adhesive composition, in particular a two part hybrid adhesive, wherein step-growth formation of a polyurea/urethane occurs simultaneously with addition polymerization of acrylic monomers/oligomers.

BACKGROUND OF THE INVENTION

The growing use of plastic materials to replace conventional wood and metal components in a variety of semi-structural and structural applications poses difficult bonding challenges for adhesives. Primers and surface treatments are often used to provide adequate adhesion, but increase the cost and complexity of the bonding process. It has recently been discovered that adhesives based on organoborane initiators can improve the adhesion to plastics of free-radically cured adhesive compositions. (M. F. Sonnenschein et al., Macromolecules, 2004, 37, 7974-7978).

Due to the pyrophoric nature of organoboranes, they must be complexed to avoid oxidative decomposition in air. Typically, organoboranes are complexed with amines. A number of two part systems have been described in the literature where the complexed organoborane is present in one part and a decomplexing agent is present in the second part. However, these systems still suffer from poor shelf stability or excessively fast reaction. One method to enhance shelf stability is to use a vast excess of amine in the part containing the organoborane to drive the equilibrium toward the complexed material. Nitrogen/boron ratios above 4 and as high as 34 have been proposed. (Webb et al. U.S. Pat. No. 6,740,716 B2). Such high ratios improve stability, but may still require exotic stabilizers such as hydroxyl amines or nitrile oxides to avoid premature free radical polymerization if a free radically polymerizable component is present in the part containing the organoborane. (Jialanella et al. US 2005/0004332 A1, and Proceedings of the 30th Annual Meeting of the Adhesion Society, 2007, p. 147). In addition, when isocyanate is used as the decomplexing agent, its rapid reaction with the amine, particularly at high levels of amine, can cause the adhesive to get very hot and the reaction to proceed too fast. Excessively fast reactions do not provide sufficient time for the adhesive to form a strong bond with the substrate. (Pocius, U.S. Pat. No. 6,093,778 (col. 13, line 52) and Webb et al., U.S. Pat. No. 7,235,617 B2 (col. 16, lines 4-47)). To overcome this problem, high levels, ~40%, of high heat capacity fillers have been employed. (Webb et al. U.S. Pat. No. 7,235,617). However, use of high levels of filler can lead to separation during storage and create difficulties in dispensing the adhesive.

Therefore the need exists for a two part adhesive system with good stability, high adhesion to untreated plastic substrates, and good processing characteristics in conventional equipment. The invention fulfills this need.

SUMMARY OF THE INVENTION

The invention is directed to an adhesive composition wherein step-growth formation of a polyurea/urethane occurs simultaneously with addition polymerization of acrylic monomers/oligomers. More specifically, the invention is directed to a two part hybrid adhesive. In the practice of the invention, one part (A) comprises an organoborane-amine complex and the other part (B) comprises a polyisocyanate compound. Upon combination of the two parts the polyisocyanate reacts with the amine to liberate the borane, which subsequently initiates free radical polymerization of the acrylic monomers/oligomers.

One embodiment of the invention is directed to a polymerizable adhesive composition comprising an organoborane amine complex, a polyamine component, a polyisocyanate component, a free radically polymerizable component, and contains substantially no polyol. Together, the organoborane amine complex and the polyamine component have a nitrogen to boron atomic ratio of less than 4.

Another embodiment of the invention is directed to a polymerizable adhesive composition comprising an organoborane amine complex component, a polyisocyanate component, a polyamine component, a free radically polymerizable component, and contains substantially no polyol. In this embodiment the polyurethane/urea formed is more than 40% of the total composition by weight, preferably more than 50 wt %.

Another embodiment of the invention is directed to a polymerizable adhesive composition comprising an organoborane amine complex component, a polyisocyanate component, a polyamine component, and a free radically polymerizable component, wherein the polyisocyanate is more than 40% by weight of part (B), preferably 50 wt % or more.

Another embodiment of the invention is directed to a polymerizable adhesive composition comprising an organoborane amine complex component, a polyisocyanate component, a polyamine component, and a free radically polymerizable component, wherein the polyisocyanate is an isocyanate-terminated prepolymer.

The invention provides a two part polymerizable adhesive composition comprising
a first part (A) comprising an organoborane amine complex component, a polyamine component, and a free radically polymerizable component selected from the group consisting of monomers, oligomers, or polymers with olefinic unsaturation and mixtures thereof; and
a second part (B) comprising a polyisocyanate component.
In one aspect of this embodiment, the first part (A) contains substantially no hydroxyl amine or nitrile oxide-based stabilizer.

In one preferred embodiment, the first part (A) comprises from about 2 to 80 wt % of the polyamine component and from 5 to 80 wt % of the free radically polymerizable component (based on the weight of part (A)) and a second part (B) comprises from about 30 to 100 wt % of said polyisocyanate component and up to about 60 wt % of the free radically polymerizable component (based on the weight of part (B)).

In another preferred embodiment, the first part (A) comprises from about 20 to about 40 wt % of the polyamine component, and from 30 to 60 wt % of the free radically polymerizable component and at feast 5 wt % of a polymeric thickener (based on the weight of part (A)) and the second part (B) comprises from about 50 to 80 wt % of the polyisocyanate component and from 15 to 45 wt % of the free radically polymerizable component (based on the weight of part (B)).

The adhesives of the invention may optionally also comprise tackifiers, fillers, polymeric thickeners, catalysts for the reaction of isocyanate with active hydrogens, such as tin catalysts available from Air Products, and other desired additives.

Another embodiment of the invention is directed to a method for bonding materials together which comprises applying the two part adhesive compositions described above to a first substrate, bringing a second substrate in contact with the composition applied to the first substrate, and allowing the composition to cure/polymerize. Included are methods of bonding together substrates in the manufacture of various useful articles, in particular articles or end use applications that require bonding of plastic substrates.

Still another embodiment of the invention is directed to an article of manufacture, in particular articles comprising a plastic substrate, which comprise the adhesive of the invention that has been cured/polymerized. The adhesive of the invention is particularly well suited for use in the bonding of automotive lamps, construction of windows and doors, and lamination of structural panels such as those used as office partitions and the assembly of recreational vehicles.

DETAILED DESCRIPTION OF THE INVENTION

All references cited herein are incorporated in their entireties by reference.

Part (A) of the adhesive contains the organoborane amine complex. This complex can be formed in-situ, during mixing of this part of the adhesive composition, or for ease of processing is preferable formed in a separate step. The structure of the complex can be varied to alter the reactivity. Procedures for preparation of organoborane amine complexes and the stability of various complexes are described in M. F. Sonnenschein et al., Macromolecules, 2006, 39, 2507-2513, and U.S. Pat. No. 6,710,145 B2. Monoamines can be used but polyamines are preferred to produce a stronger network upon reaction with polyisocyanate. Monoamines would act as chain terminators. Most preferred is triethylborane-1,3-diaminopropane available from BASF as a solution in excess 1,3-diaminopropane. In this form the material is non-pyrophoric and easily added to adhesive formulations.

Part (A) of the adhesive will also contain a polyamine component. Borane forms a 1:1 complex with an amine. Additional amine beyond the stoichiometric level to form the complex is needed to avoid premature free radical polymerization in part (A) and adequate shelf life of the adhesive. At least the majority, and more preferably all of this additional amine is a polyamine. To maximize the toughness of the polyurethane/urea network, it is desirable that some portion of this polyamine be of higher molecular weight, preferably above 150 Da but below 10,000 Da. Polyamines are molecules with more than one isocyanate-reactive amine group. The polymer may have amine present as end groups or on side chains. Primary or secondary amines can be used. Primary groups are preferred for maximum reaction speed and stability. However, secondary amines are preferred for adhesive compositions where a more flexible adhesive is desired. For the same reason, difunctional polymers with amine ends are preferred. Most preferred are telechelic polyethers, preferably polypropylene glycol diamine such as Jeffamine D-230 and Jeffamine XTJ-510, both available from Huntsman. The equivalent ratio of amine groups to organoborane groups should be above 1:1 for good stability, but it is preferred that it not be too high to avoid too rapid reaction and consequently poor adhesion. Thus the atomic ratio of nitrogen from amine to boron form organoborane is preferably less than 10, and more preferably less than 4.

At least one free radically polymerizable component (FRPC) will be present in part (A) or in part (B), or in both parts (A) and (B). The free radically polymerizable component of the invention include any monomers, oligomers, polymers or mixtures thereof which contain olefinic unsaturation which can polymerize by free-radical addition polymerization. Such compounds are well known to those skilled in the art. A detailed description is provided in Webb U.S. Pat. No. 7,235,617, B2, column 10, line 64 and is incorporated herein by reference. Styrenic, vinyl, acrylic and methacrylic monomers are suitable. These include styrene, alpha-methyl styrene, vinyl esters such as vinyl neodecanoate and vinyl acetate, acrylic and methacrylic monomers such as acrylic acid and methyl methacrylate. The free radically polymerizable components are added to part (A) and/or part (B) at 2-80% of the composition of that part. Preferred levels are 30-60% of part (A) and 15-45% of part (B). These materials form the addition polymerized network initiated by the liberated organoborane. A variety of monomers are useful and their choice will depend on the final adhesive properties desired and the substrates to be bonded. The monomers chosen may also be reactive with the polyisocyanate as well as free radicals. For instance, they may contain thiol, amine, or hydroxyl functionality. These monomers serve to link the addition polymerized network with the polyurethane/urea network. Oligomeric acrylates and methacrylates include polyurethane acrylates and bisphenol-A based acrylates available from Sartomer Chemical as well as common crosslinkers such as hexanediol diacrylate, trimethylol propane triacrylate, and pentaerythritol triacrylate, also available from Sartomer. Preferred monomers include methyl methacrylate, isobornyl acrylate, butyl methacrylate, 2-ethyl hexyl methacrylate, isobornyl methacrylate, cyclohexyl acrylate, hydroxyl propyl methacrylate, and hydroxyl ethyl methacrylate. Most preferred are blends of methyl methacrylate and hydroxyl methyl methacrylate, where the equivalents of hydroxyl groups is sufficient to react at least 15% of the isocyanate groups, more preferably where the hydroxyls consume more than 35% of the isocyanate groups.

Part (A) may optionally contain other isocyanate reactive materials which will become part of the final polyurethane/urea network. Examples include polythiols such as those available from Chevron-Phillips, polyols such as those available from Arch Chemical, polyamide polyols such as those available from Arizona Chemical under the tradename Papol, and polyester polyols such as those available from Bayer. Materials with a combination of reactive groups such as amino-alcohols or thiol-amines are also useful.

Polyols useful in the practice of the invention include polyhydroxy ethers (substituted or unsubstituted polyalkylene ether glycols or polyhydroxy polyalkylene ethers), the ethylene or propylene oxide adducts of polyols and the monosubstituted esters of glycerol, polyamide polyols, amorphous and liquid polyesters, castor oil and vegetable oils of different molecular weight and functionality, other fatty polyols, polybutadiene dial, polyisobutylene diol as well as mixtures thereof.

Examples of polyether polyols include a linear and/or branched polyether having hydroxyl groups, and contain substantially no functional group other than the hydroxyl groups. Examples of the polyether polyol may include polyoxyalkylene polyol such as polyethylene glycol, polypropylene glycol, polybutylene glycol and the like. Further, a homopolymer and a copolymer of the polyoxyalkylene polyols may also be employed. Particularly preferable copolymers of the polyoxyalkylene polyols may include an adduct at least one compound selected from the group consisting of ethylene glycol, propylene glycol, diethylene glycol, dipropylene glycol, triethylene glycol, 2-ethylhexanediol-1,3,glycerin, 1,2,6-hexane triol, trimethylol propane, trimethylol ethane, tris(hydroxyphenyl)propane, triethanolamine, triisopropanolamine, ethylenediamine and ethanolamine; with at least one compound selected from the group consisting of ethylene oxide, propylene oxide and butylene oxide.

A number of suitable polyols are commercially available. Non-limiting examples include polyethers such as ARCOL PPG 2025 (Bayer), PolyG 20-56 (Arch) and PolyG 30-42 (Arch), polyamide polyols such as PAPOL polyol (Arizona Chemical), amorphous or liquid polyesters such as Dynacoll 7230 (Degussa) and Stepanpol PD-56 (Stepan), and polybutadiene such as PolyBD R-45HTLO (Sartomer). "Polymer polyols" are also suitable, i.e., graft polyols containing a proportion of a vinyl monomer, polymerized in situ, e.g., Niax 34-28 (Union Carbide). Additional polyols include polycaprolactone diols and polycarbonate diols.

Examples of fatty polyols may include castor oil, the products of hydroxylation of unsaturated or polyunsaturated natural oils, the products of hydrogenations of unsaturated or polyunsaturated polyhydroxyl natural oils, polyhydroxyl esters of alkyl hydroxyl fatty acids, polymerized natural oils, soybean polyol, and alkylhydroxylated amides of fatty acids.

Tackifiers may also optionally be used in the practice of the invention. The tackifier may be present in either of part (A) or part (B), or may be present in both parts (A) and (B), The tackifier used is one that is non-reactive with the components in the part in which it is used. The tackifier component will usually be present in an amount of from about 0 wt % to about 50 wt %, more preferably from about 10 wt % to about 40 wt %. Various conventional tackifiers can be used in the practice of the invention are described in C. W. Paul, Hot Melt Adhesives, in *Adhesion Science and Engineering*—2, *Surfaces, Chemistry and Applications*, M. Chaudhury and S. V. Pocius, eds., Elsevier, New York, 2002, p. 711. These include natural and synthetic resins. Natural resins include rosin, rosin esters, and polyterpenes. Synthetic resins include C5 cyclic and acyclic resins, aromatic resins, C9 resins, pure monomer resins such as those based on alpha-methyl styrene, and copolymer resins of the above monomers with each other and/or phenol. One class or preferred tackifiers are terpene phenol resins such as those available from Arizona Chemical.

Fillers and polymeric thickeners may also optionally be added to the compositions of the invention.

Fillers may be optionally added to part (A) or part (B). Low levels of extremely fine fillers are desired to minimize chances of settling. Conventional fillers such as talc, calcium carbonate, titanium dioxide, and silica can be added at 0 to 5%. Preferred is fumed silica provided to control sag of the applied adhesive bead.

To control viscosity a variety of polymers are useful. These include polyacrylates such as those available from Ineos based primarily on methyl methacrylate and butyl methacrylate and styrenic block copolymers available from Kraton and Firestone and chlorosulfonated polyethylene. Thermoplastic elastomers which can dissolve in the adhesive composition, but reform their hard phases upon cure are particularly preferred. Polymeric thickeners may be added to part (A), part (B) or to both parts (A) and (B).

Part (B) comprises polyisocyanate, preferably 30-100%, more preferably more than 40%, and most preferably >50%. The polyisocyanate acts as the decomplexing agent for the borane-amine complex thus liberating the borane which initiates polymerization of the free radically polymerizable components. Various polyisocyanates can be used including aromatic and aliphatic isocyanates. Examples of useful polyisocyanates are described in Deviny, U.S. Pat. No. 5,872,197, col. 4, line 57 to col. 5, line 58, and are incorporated herein by reference. Any suitable compound, which contains two or more isocyanate groups, may be used in the practice of the invention. Organic polyisocyanates which may be used to practice the invention include alkylene diisocyanates, cycloalkylene diisocyanates, aromatic diisocyanates and aliphatic-aromatic diisocyanates. Specific examples of suitable isocyanate-containing compounds include, but are not limited to, ethylene diisocyanate, ethylidene diisocyanate, propylene diisocyanate, butylene diisocyanate, trimethylene diisocyanate, hexamethylene diisocyanate, toluene diisocyanate, cyclopentylene-1,3-diisocyanate, cyclo-hexylene-1,4-diisocyanate, cyclohexylene-1,2-diisocyanate, 4,4'-diphenylmethane diisocyanate, 2,2-diphenylpropane-4,4'-diisocyanate, xylylene diisocyanate, 1,4-naphthylene diisocyanate, 1,5-naphthylene diisocyanate, m-phenylene diisocyanate, p-phenylene diisocyanate, diphenyl-4,4'-diisocyanate, azobenzene-4,4'-diisocyanate, diphenylsulphone-4,4'-diisocyanate, 2,4-tolylene diisocyanate, dichlorohexa-methylene diisocyanate, furfurylidene diisocyanate, 1-chlorobenzene-2,4-diisocyanate, 4,4',4"-triisocyanatotriphenylmethane, 1,3,5-triisocyanato-benzene, 2,4,6-triisocyanato-toluene, 4,4'-dimethyldiphenyl-methane-2,2',5,5'-tetratetraisocyanate, and the like. While such compounds are commercially available, methods for synthesizing such compounds are well known in the art. Preferred isocyanate-containing compounds are hexamethylene diisocyanate, toluene diisocyanate (TDI), isophoronediisocyante (IPDI), hydrogenated MDI (HMDI) methyenebisphenyldiisocyanate (MDI) and poly-MDI (with functionality greater than 2).

One preferred component are isocyanate terminated prepolymers formed by reacting excess isocyanate such as those listed above with polyols or polyamines such as those described above. Preferably the level of isocyanate groups is reduced to a level less than 20% of the total prepolymer. Most preferred is Vorite 689, a prepolymer of 4,4' methylene diisocyanate and castor oil, available from Vertellus.

Part (B) optionally also contains up to 60% of a free radically polymerizable component as those described above, more preferably 15-45%. However, these components should not contain isocyanate reactive groups. Most preferred is methyl methacrylate.

Part (B) may also optionally contain filler and polymer at similar amounts and types as described for part (A). Again, any isocyanate reactive groups should be avoided.

The hybrid adhesive preferably contains at least 40% by weight of urea, more preferably at least 50%. Percent urea means the percent by weight of the urea/urethane phase in the final product. This can be generally determined by adding the weight of the isocyanate and amine (and any other isocyanate reactive compounds present) and dividing this sum by the total weight of the ingredients.

To facilitate thorough mixing of parts (A) and (B) it is desirable that they have similar viscosities and that the ratio of the two parts is nearly equal. Preferably the ratio of parts of part (A) to parts of part (B) will be less than 4:1 to more than 1:4, more preferably from 2:1 to 1:2, even more preferably 1:1.

EXAMPLES

The invention is further illustrated by the following non-limiting examples.

Example 1

Preparation of Part (A):

To a clean vessel equipped with a stir paddle, charge in 25 parts of Jeffamine XTJ-510 and 21 parts of Sylvares TP 2019 tackifier (number average molecular weight: 575, hydroxyl number: 60-80). Heat the vessel up to melt the tackifier. Cool the vessel down to room temperature. Mix in 2 parts of Jeffamine D-230, 12 parts of hydroxyl ethyl methacrylate, 31 parts of methyl methacrylate, 3 parts of rheology modifier Cab-o-sil TS720, and 6 parts of triethylborane-1,3-diaminopropane complex. Also included was 0.02 parts of 8-hydroxyquinoline.

Preparation of Part (B):

To a clean vessel equipped with a stir paddle, charge in 60 parts of Vorite 689, 30 parts of methyl methacrylate monomer, and 10 parts of methyl methacrylate/butyl methacrylate copolymer. Also included was 0.02 parts of a tin catalyst (Metacure T-12). Mix until homogenous.

Example 2

Preparation of Part (A):

To a clean vessel equipped with a stir paddle, charge in 30 parts of Jeffamine D-2000, 20 parts of methyl methacrylate/butyl methacrylate copolymer, 29 parts of methyl methacrylate, 17 parts of hydroxyl ethyl methacrylate, and 4 parts of triethylborane-1,3-diaminopropane complex. Mix until homogenous.

Preparation of Part (B):

Same as Example 1.

Example 3

Preparation of Part (A):

To a clean vessel equipped with a stir paddle, charge in 30 parts of Jeffamine XTJ-510, 23 parts of methyl methacrylate/butyl methacrylate copolymer, 30 parts of methyl methacrylate, 10 parts of hydroxyl ethyl methacrylate, 1 part of Jeffamine T-403, and 6 parts of triethylborane-1,3-diaminopropane complex. Also included was 0.02 parts of 8-hydroxyquinoline. Mix until homogenous.

Preparation of Part (B):

To a clean vessel equipped with a stir paddle, charge in 50 parts of Vorite 689, 40 parts of methyl methacrylate, and 10 parts of methyl methacrylate/butyl methacrylate copolymer. Also included was 0.02 parts of a tin catalyst (Metacure T-12). Mix until homogenous.

Example 4

Preparation of Part (A):

To a clean vessel equipped with a stir paddle, charge in 30 parts of Jeffamine XTJ-510, 23 parts of methyl methacrylate/butyl methacrylate copolymer, 28 parts of methyl methacrylate, 15 parts of hydroxyl ethyl methacrylate, 1 part of Jeffamine T-403, and 3 parts of triethylborane-1,3-diaminopropane complex. Also included was 0.02 parts of 8-hydroxyquinoline. Mix until homogenous.

Preparation of Part (B):

To a clean vessel equipped with a stir paddle, charge in 50 parts of Vorite 689, 30 parts of methyl methacrylate, and 20 parts of methyl methacrylate/butyl methacrylate copolymer. Also included was 0.02 parts of a tin catalyst (Metacure T-12). Mix until homogenous.

Example 5

The performance of the adhesives of Examples 1-4 was tested by lap shear bonds. The substrate used for the testing was 20% talc-filled polypropylene with a surface energy of less than 30 dyn/cm. One inch by four inches polypropylene strips were used to make bonds. Part A and Part B of the adhesive composition were mixed through a static mixing gun at 1:1 volume ratio and applied onto one piece of the substrate. A second piece of substrate was mated onto the first substrate with a one square inch of overlapping glue area. The thickness of the adhesive was about 0.025 inch. After cure, bonds were tested at room temperature on an Instron machine with a crosshead speed of 0.5 inches/min. Results are shown in Table 1. The actual number for the bond strength set forth in Table 1 was the measurement at which substrate failure occurred.

TABLE 1

|  | Example 1 | Example 2 | Example 3 | Example 4 |
|---|---|---|---|---|
| N/B ratio | 3.4 | 3.8 | 3.1 | 3.8 |
| % urea | 61 | 54 | 46 | 48 |
| % isocyanate equivalence consumed by functional monomer | 38 | 54 | 38 | 57 |
| Bond strength (psi) | >562 | >519 | >600 | >550 |

The invention claimed is:

1. A polymerizable adhesive composition comprising an organoborane amine complex and a polyamine with a nitrogen to boron atomic ratio of less than 4, an isocyanate-terminated prepolymer made from an excess of isocyanate with polyol or polyamine, a free radically polymerizable component, and substantially no polyol, wherein the isocyanate-terminated prepolymer is present in an amount greater than 60 wt %.

2. A polymerizable adhesive composition comprising an organoborane amine complex, a polyamine component, a free radically polymerizable component, an isocyanate-terminated prepolymer made from an excess of isocyanate with polyol or polyamine, said composition comprising more than 50 wt % of urea, and substantially no polyol, wherein the isocyanate-terminated prepolymer is present in an amount greater than 60 wt %.

3. A polymerizable adhesive composition comprising an organoborane amine complex, a polyamine component, a free radically polymerizable component, and an isocyanate-terminated prepolymer made from an excess of isocyanate with polyol or polyamine, wherein the isocyanate-terminated prepolymer is present in an amount greater than 60 wt %.

4. The adhesive of claim 3 which is a two part adhesive comprising a part (A) and a part (B), wherein the ratio of part (A) to part (B) is from less than 4:1 to more than 1:4.

5. The adhesive of claim 4, said composition comprising 60 to 100 wt % polyisocyanate in a second part (B).

6. A polymerizable adhesive composition comprising an organoborane amine complex and a polyamine with a nitrogen to boron atomic ratio of less than 4, a polyisocyanate component, a free radically polymerizable component, and substantially no polyol, wherein the polyisocyanate component is present in an amount greater than 60 wt %.

7. A polymerizable adhesive composition comprising an organoborane amine complex, a polyamine component, a free radically polymerizable component, and an isocyanate-terminated prepolymer made from an excess of isocyanate with polyol or polyamine, wherein the isocyanate-terminated prepolymer is present in an amount greater than 60 wt % and the adhesive is in a two part format, wherein the ratio of part (A) to part (B) is from less than 4:1 to more than 1:4.

8. A polymerizable adhesive composition comprising an organoborane amine complex, a polyamine component, a free radically polymerizable component, and a polyisocyanate, wherein the adhesive is a two part format, wherein the ratio of part (A) to part (B) is from less than 4:1 to more than 1:4 and part (B) comprises 60 to 100 wt % polyisocyanate.

* * * * *